United States Patent
Fukuda et al.

(10) Patent No.: US 7,121,067 B1
(45) Date of Patent: *Oct. 17, 2006

(54) METHOD OF LONGITUDINALLY SEALING TUBULAR BAG-MAKING MATERIAL

(75) Inventors: Masao Fukuda, Shiga (JP); Michihiro Kubo, Shiga (JP)

(73) Assignee: Ishida Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 674 days.

(21) Appl. No.: 09/372,009

(22) Filed: Aug. 11, 1999

(30) Foreign Application Priority Data

Aug. 20, 1998 (JP) .......................... 10-234669
Aug. 25, 1998 (JP) .......................... 10-238412

(51) Int. Cl.
B65B 9/06 (2006.01)

(52) U.S. Cl. .......................... 53/551; 53/550
(58) Field of Classification Search .............. 53/550, 53/551
See application file for complete search history.

(56) References Cited

U.S. PATENT DOCUMENTS

| | | | |
|---|---|---|---|
| 4,219,988 A | | 9/1980 | Shanklin et al. |
| 4,555,289 A | * | 11/1985 | Kreager .................. 156/203 |
| 4,660,356 A | * | 4/1987 | Simionato .................. 53/551 |
| 5,125,217 A | * | 6/1992 | Fukuda .................. 53/551 |
| 5,290,159 A | * | 3/1994 | Miller et al. .................. 417/521 |
| 5,412,927 A | | 5/1995 | Miyazaki et al. |
| 5,533,322 A | * | 7/1996 | Bacon et al. .................. 53/451 |
| 5,540,035 A | * | 7/1996 | Plahm et al. .................. 53/451 |
| 5,619,844 A | * | 4/1997 | Meli et al. .................. 53/550 |
| 5,675,958 A | * | 10/1997 | Shanklin et al. .................. 53/374.6 |
| 5,743,066 A | * | 4/1998 | Fukuda et al. .................. 53/64 |
| 5,755,082 A | * | 5/1998 | Takahashi .................. 53/511 |
| 5,791,126 A | * | 8/1998 | Kammler et al. .................. 53/546 |

FOREIGN PATENT DOCUMENTS

| | | |
|---|---|---|
| DE | 19541617 | 11/1995 |
| EP | 0611697 | 2/1994 |
| EP | 0759397 | 8/1996 |

OTHER PUBLICATIONS

Issue Fee Transmittal, with Certificate of Mailing.
Change of Address of Fee Addressee, with Certificate of Mailing.
Check No. 10084 in the amount of $1,403.

* cited by examiner

*Primary Examiner*—Eugene Kim
*Assistant Examiner*—Christopher Harmon
(74) *Attorney, Agent, or Firm*—Beyer Weaver & Thomas LLP

(57) ABSTRACT

A packaging machine moves its heater unit for longitudinal sealing of a tubularly formed film between a sealing position at which the heater unit contacts the film and a retracted position at which it is separated from the film. In addition to the mechanism for this motion, an air cylinder is provided for controlling the compressive force with which the heater unit at its sealing position compresses the film. A pressure controlling system regulates the air pressure supplied to the air cylinder. If the mechanism for moving the heater unit also employs another air cylinder, a higher pressure for moving the heater unit and a lower pressure for controlling its compressive force may be generated from a single air source and supplied to the two air cylinders by a switching mechanism. A single air cylinder with two air chambers may be used for the both functions. A motor is additionally provided for removing the heater unit and its support unit much farther away from the film to provide a large enough space for exchanging the former and/or the chute of the packaging machine.

7 Claims, 10 Drawing Sheets

METHOD OF LONGITUDINALLY SEALING TUBULAR BAG-MAKING MATERIAL

BACKGROUND OF THE INVENTION

This invention relates to a method of using a form-fill-seal packaging machine for forming bags while concurrently filling and sealing them with articles to be packaged and more particularly to a method of longitudinally sealing a tubularly formed bag-making material to form a bag by using such a bag-making material.

In general, a packaging machine of this type is structured so as to bend an elongated web of thermoplastic bag-making material (herein referred to as the "film") into a tubular form around a chute through which articles are dropped to be packaged, to longitudinally seal its mutually overlapping side edges by means of a longitudinal sealer and then to seal the tubularly formed film transversely to produce a packaged product.

The aforementioned process of longitudinal sealing is usually effected by causing a heated heater block to intermittently come into contact with the chute so as to sandwich and compress the overlapped edge parts of the film between the block and the outer front surface of the chute while the film is being transported longitudinally (the intermittent mode of film transportation) or by leaving a heated metallic heater belt in contact with the chute such that the overlapped edge parts of the film is continuously pressed against each other between the block and the chute (the continuous mode of film transportation). In what follows, such a heater block and a heater belt will be both referred to as the "heater" and discussed together for convenience.

In either mode of transportation described above, the heater is adapted to move between a sealing position where the heater comes into contact with the chute to effect the longitudinal sealing and a retracted position to which the heater is moved away from the chute. In the intermittent mode of transportation, the heater is moved to a retracted position while the film is being transported. In the continuous mode of transportation, on the other hand, the heater is moved to the retracted position when, for example, a trouble has occurred and the transportation of the film is interrupted temporarily in order to prevent the overheating of the film.

While the heater is at the sealing position, it presses the film against the chute with a specified pressure for the thermal sealing. This compressive pressure is usually supplied by the biasing force of a spring, and it has been the practice to adjust its compressive force. It sometimes happens when the chute is attached to the main frame of the packaging machine, however, that the chute is not exactly at the intended position, depending on the manner in which the attachment is effected, or that the relative position changes or the shape of the heater changes after many years of use. In such a situation, the sealing position of the heater may change and the compressive force by the spring may also change. Thus, the compressive force of the spring had to be adjusted as the sealing position of the heater changed.

Manual adjustment of the spring could not be done very accurately. Moreover, the recent trend is that the compressive force of the spring must be adjusted not only according to the film characteristics such as its thickness and material but also according to the method of sealing such as the so-called lap sealing and fin sealing and also according to the operational capabilities and conditions. In other words, fine adjustments of the compressive force of the spring according to many factors are now a commonly required procedure.

As explained above, furthermore, the heater must generally be moved between a sealing position and a retracted position. A quick response is required in this motion such that the heater can move between these positions as instantaneously as possible. This means that a fairly large force is necessary for the motion of the heater and further that a different kind of improved control is necessary. Thus, there is now a new problem of how to control these two kinds of forces on the single heater.

SUMMARY OF THE INVENTION

It is therefore an object of this invention to provide a packaging machine capable of efficiently effecting both the control on the motion of the heater between its sealing and retracted positions and the control of the compressive force of the heater at is sealing position.

A packaging machine embodying this invention, with which the above and other objects can be accomplished, may be characterized as comprising not only a heater driving means for moving a heater unit for longitudinal sealing of a tubularly formed film between a sealing position at which the heater unit contacts the film and a retracted position at which it is separated therefrom, but also an air cylinder for controlling the compressive force with which the heater unit at the sealing position compresses the film against a cylindrical chute around which the film is formed into a tubular form. Means for regulating the air pressure supplied to this air cylinder is provided, and a controller serves to control and vary this specified level. The air cylinder for controlling the pressure actually does not operate to change the relative position of the heater unit with respect to the chute. The heater unit is supported by a support unit which is slidable towards or away from the chute and the heater driving means serves to operate only on the support unit, while the air cylinder operates only on the heater unit, not on the support unit, although this heater driving means may itself comprise another air cylinder. A separate motor may also be provided for removing the heater unit and its support unit much farther away from the chute, say, for exchanging the former and/or the chute of the packaging machine.

With a packaging machine thus characterized, the force with which the film is compressed by the heater unit to effect longitudinal sealing can be accurately controlled, say, according to the characteristics of the film such as its material and its thickness, because an air cylinder for this particular purpose is provided apart from the mechanism for moving the heater unit between its sealing and retracted positions. Even if the sealing position by the heater unit may have changed due to deformation of the chute after many years' use, for example, it is possible to apply the same compressive force on the film. Moreover, fine adjustments of the compressive force becomes possible according to this invention. If a second air cylinder is used for moving the heater unit between its sealing and retracted positions, furthermore, the response characteristics of the heater unit can be improved by using the same source of air pressure used for the air cylinder for the control of the compressive force.

The moving of the heater unit between its sealing and retracted position and the control of its compressive force on the film for effecting its longitudinal sealing may be carried out by using a single air cylinder having two chambers. Such an air cylinder will be provided with an air-pressure generating means for generating from a single air source both a higher air pressure for moving the heater unit and a lower air pressure for controlling the compressive force of the heater unit. A switching means will function such that the higher and lower pressures thus generated will be supplied to appropriate ones of these chambers of the air cylinder selectively, depending on whether the heater unit is being moved towards the sealing position or the retracted position, or its compressive force is being adjusted. A controller may be further provided such that the higher pressure can be applied to the air cylinder for a specified length of time while the lower pressure is being supplied.

BRIEF DESCRIPTION OF THE DRAWINGS

The accompanying drawings, which are incorporated in and form a part of this specification, illustrate embodiments of the invention and, together with the description, serve to explain the principles of the invention. In the drawings.

Throughout herein, like or equivalent components are indicated by the same numerals and may not necessarily be described repetitiously for simplifying the disclosure even where these components are components of different packaging machines.

DETAILED DESCRIPTION OF THE INVENTION

Figure 1:
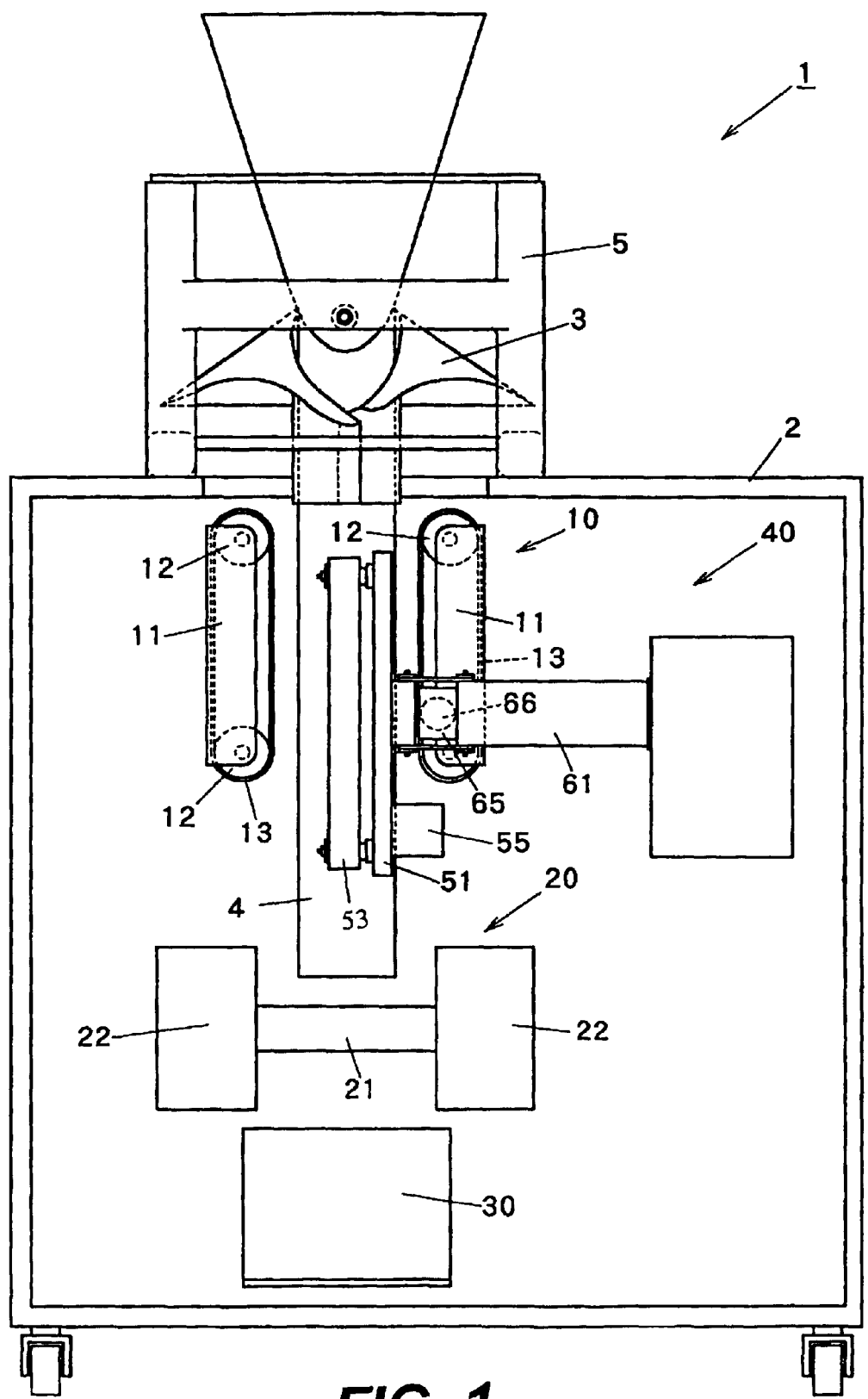
FIG. 1 is a schematic front view of a packaging machine embodying this invention.

The invention is described next by way of an example with reference to FIG. 1 wherein numeral 1 generally indicates a packaging machine 1 embodying this invention. Although not shown, there is a film holder for rotatably supporting a roll of elongated film at a backward position above its frame 2. On the front side of the machine frame 2 at elevated positions are a former 3 for bending the film pulled out of the roll in a forward direction into a tubular form while the film is being guided along a downward film path such that the mutually opposite side edges of the film become overlapped, a longitudinal sealer 40 for sealing together these mutually overlapped side edges of the film to make it into a tubular form, and a cylindrical chute 4 through which articles to be packaged are dropped into such a tubularly formed film. Numeral 5 indicates a support frame attached to the machine frame 2 for supporting the former 3 and the chute 4.

A pair of film transporting mechanisms 10 is provided on both (right-hand and left-hand) sides of the chute 4 and at about a half of its height. Although not shown in detail, each of the film transporting mechanisms 10 includes a pair of upper and lower rollers 12 supported by a covering member 11 attached to the machine frame 2. A belt member 13 is stretched over and between the rollers 12 such that the tubularly formed film is sandwiched from both sides between the pair of belt members 13 and compressed against the right-hand and left-hand side surfaces of the chute 4. Although not shown, a belt-rotating motor is also provided for rotating the rollers 12 such that the tubularly formed film is transported downward longitudinally along the chute 4.

Inside the machine frame 2 is a transverse sealer 20 having a pair of bar members 21 (only one shown in FIG. 1) disposed in front of and behind the tubularly formed film and support units 22 which support the bar members 21 such that these bar members 21 can move towards or away from each other. These bar members 21 include a heater (not shown) and are heated thereby. As these bar members 21 are moved towards each other, they sandwich the film in between and seal it transversely to its longitudinal direction of motion along two parallel seal lines. At the same time, the film is cut by a cutter attached to one of the bar members 21 along a line between the two seal lines. Numeral 30 indicates a table disposed at the bottom of the machine frame 2 for depositing the packaged products produced by this packaging machine 1.

Figure 2:
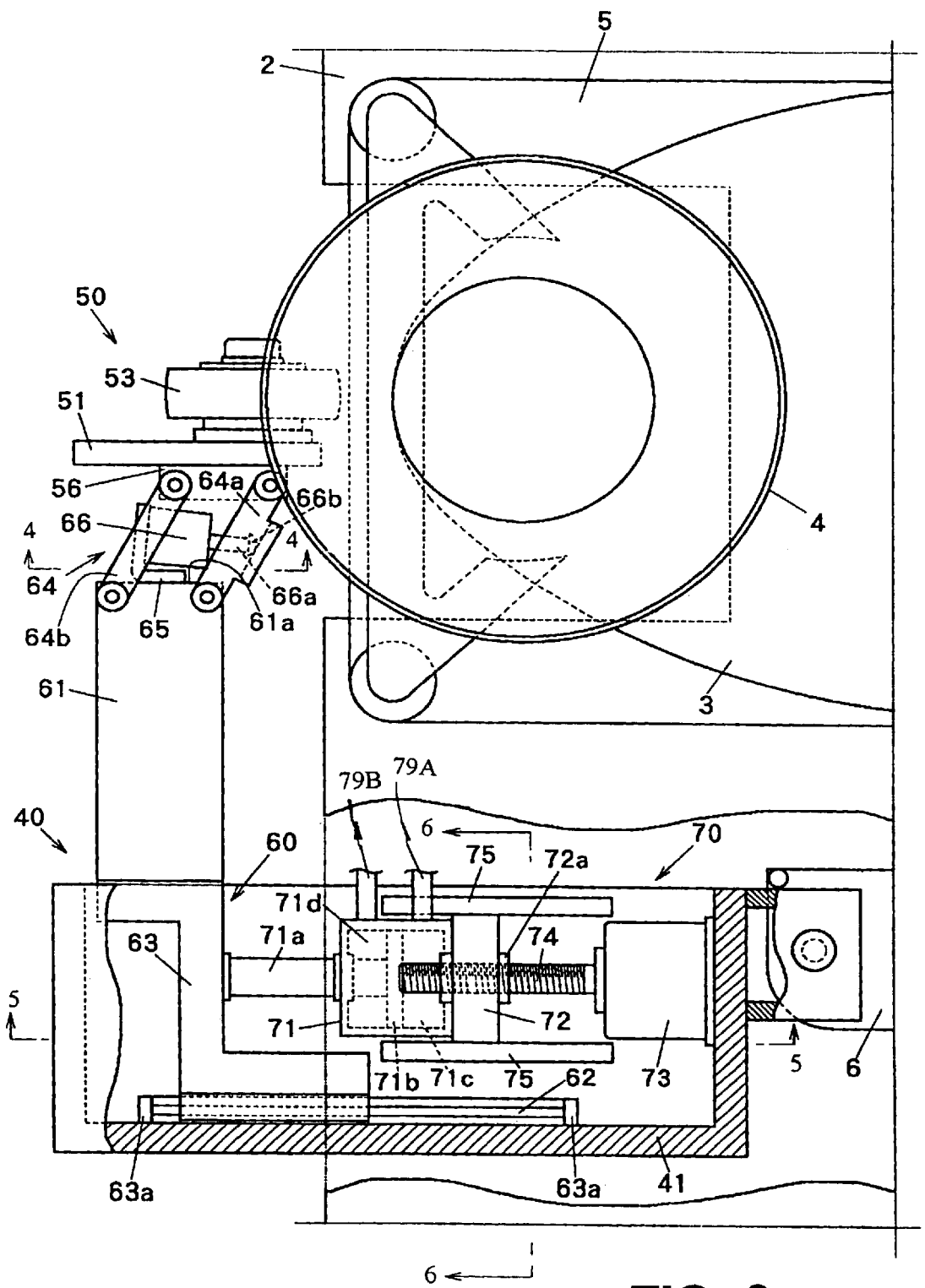
FIG. 2 is a plan view of a center portion of the packaging machine of FIG. 1.
Figure 3:
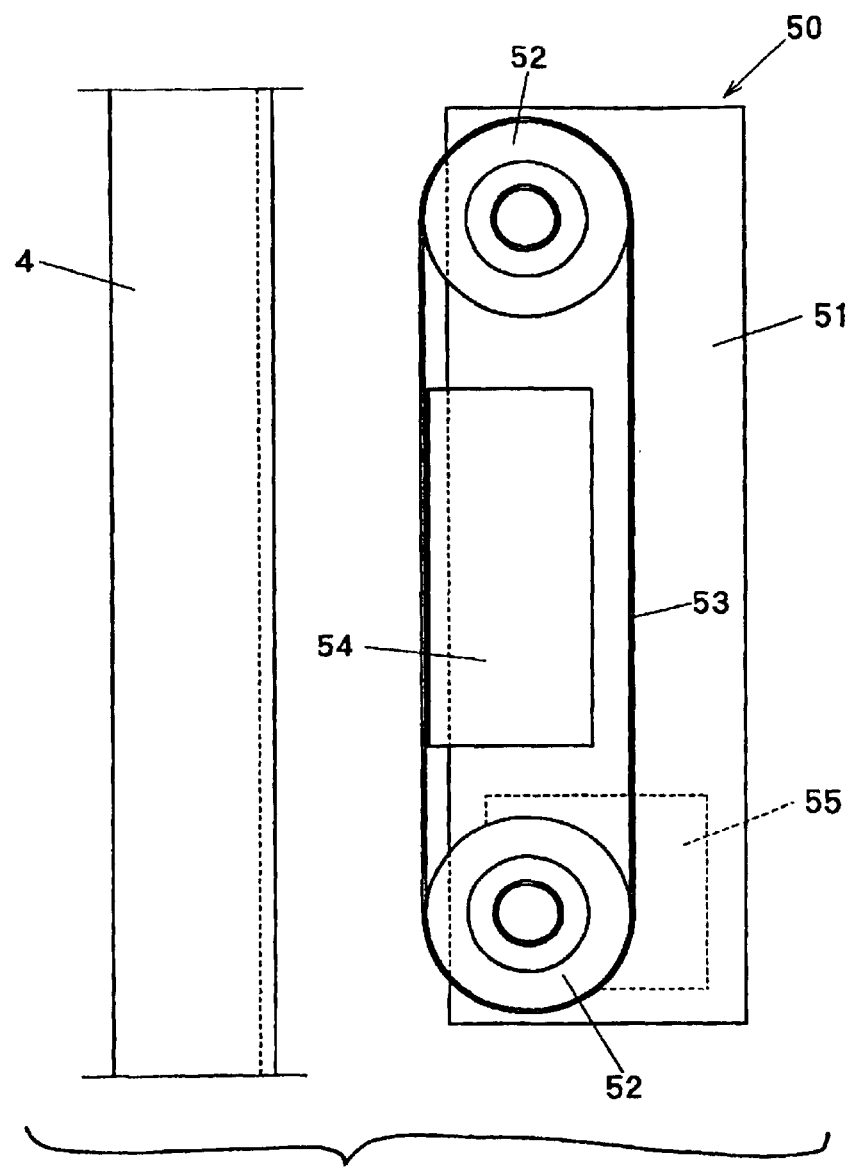
FIG. 3 is an enlarged side view of the heater unit of the packaging machine of FIG. 1.
Figure 9:
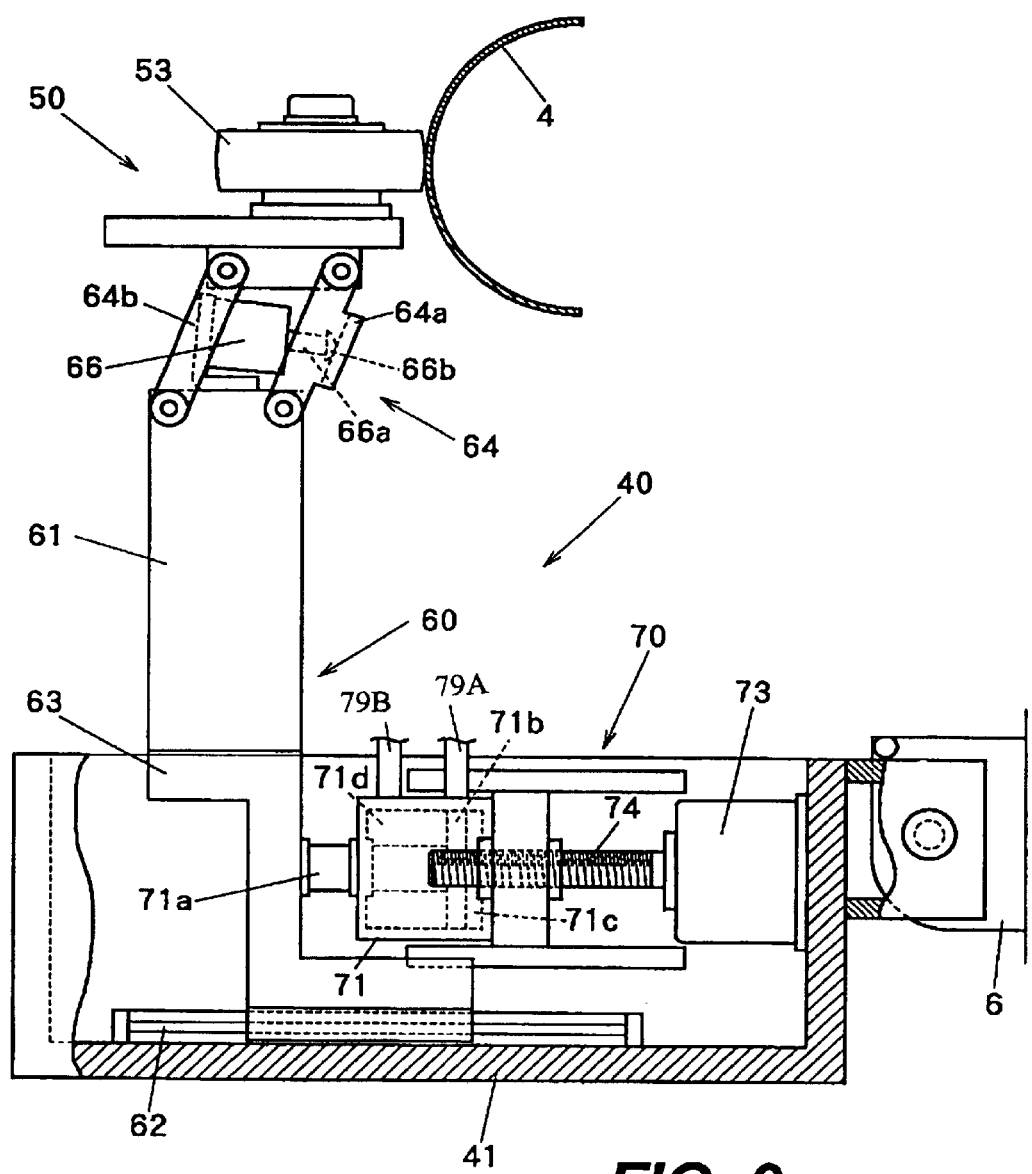
FIG. 9 is a plan view of the center portion of the packaging machine of FIG. 1 when the heater unit is compressed against the chute.

Next, the longitudinal sealer 40 will be described more in detail with reference to FIGS. 2 and 3. The longitudinal sealer 40 is attached to a rotary frame 41 supported rotatably by a main frame 6 and comprises a heater unit 50 for sealing the mutually overlapped side edges of the film, a support unit 60 which serves to support the heater unit 50 and is slidable with respect to the rotary frame 41 and a moving mechanism 70 for moving the heater unit 50 towards or away from the chute 4. The heater unit 50 includes, as shown in FIGS. 2 and 3, a pair of upper and lower pulleys 52 attached to an attachment plate 51, a heater belt 53 stretched over and between these pulleys 52, a heater block 54 which is disposed between the pulleys 52 and serves to heat the heater belt 53, and a belt-moving motor 55 for running the heater belt 53. The heater unit 50 operates the heater belt 53 so as to compress the film against the chute 4 while running in the direction of travel of the film and to thereby continuously seal the mutually overlapping side edges longitudinally together. The support unit 60 comprises an arm member 61 which extends sideways (in the right-left direction), a rail member 62 attached to an inner side surface of the rotary frame 41 and a slider member 63 which is connected to the arm member 61 and engages slidably with the rail member 62 so as to be able to slide therealong in the forward-backward direction and to thereby cause the heater unit 50 to move between the sealing position where the heater belt 53 contacts the overlapped parts of the film to seal them together (as shown in FIG. 9) and the retracted position (as shown in FIG. 2) where the heater belt 53 is no longer in contact with the film. Stoppers 63a are provided at both end positions of the rail member 62 so as to limit the sliding motion of the slider member 63.

Figure 4:
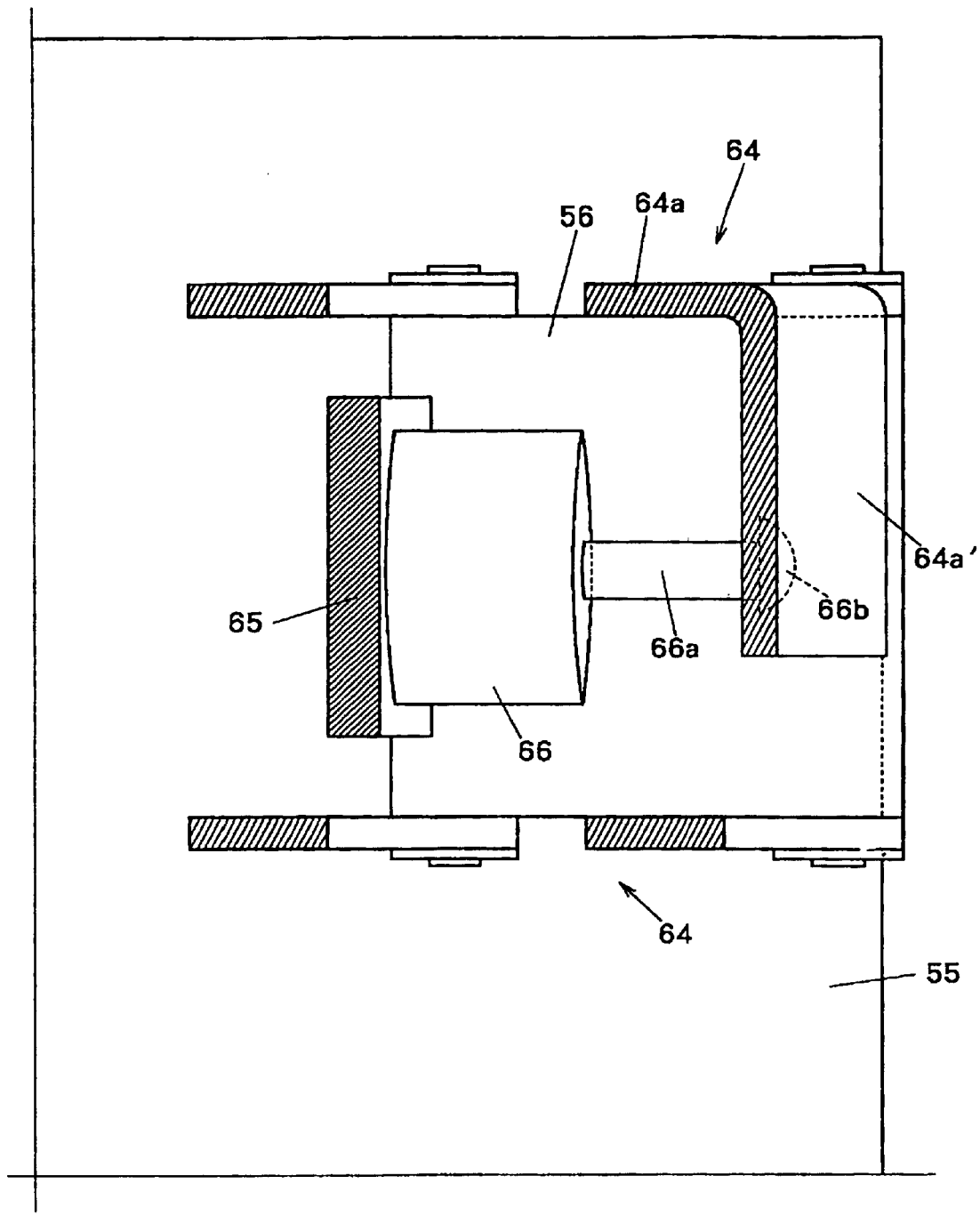
FIG. 4 is a sectional view taken along line 4—4 of FIG. 2.

Next, the manner in which the heater unit 50 is supported by the support unit 60 will be explained more in detail. On the surface of the attachment plate 51 of the heater unit 50 opposite to the surface on which the pulleys 52 are attached, as shown in FIGS. 2 and 4, there is a support plate 56 which is connected to the arm member 61 by means of a pair of mutually parallel link mechanisms 64 (of which only link members 64a and 64b are seen). An air cylinder 66 (herein referred to as the "first air cylinder") is attached to the frontal edge surface 61a of the arm member 61 through an attachment plate 65. One of the link members (64a) closer to the chute 4 has its center part extended downward and the tip of the piston rod 66a of the air cylinder 66 is attached to this extended portion 64a' of the link member 64a. Thus, the compressive force of the heater belt 53, when the heater belt 53 comes into contact with the overlapped portions of the film at the sealing position, can be adjusted by means of this air cylinder 66.

Figure 5:
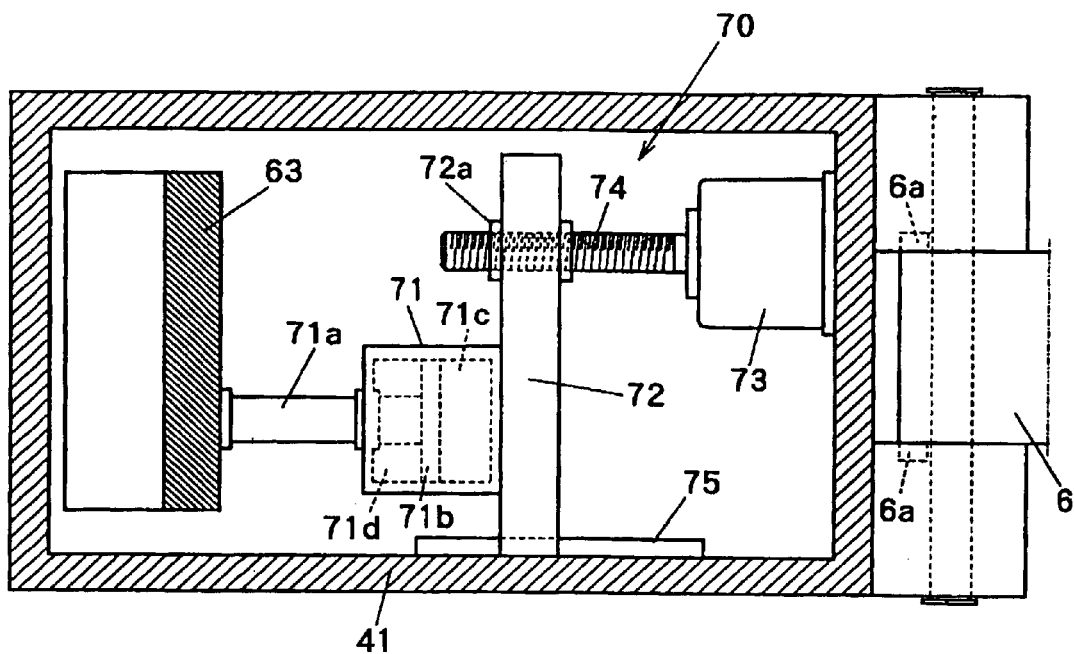
FIG. 5 is a sectional view taken along line 5—5 of FIG. 2.
Figure 6:
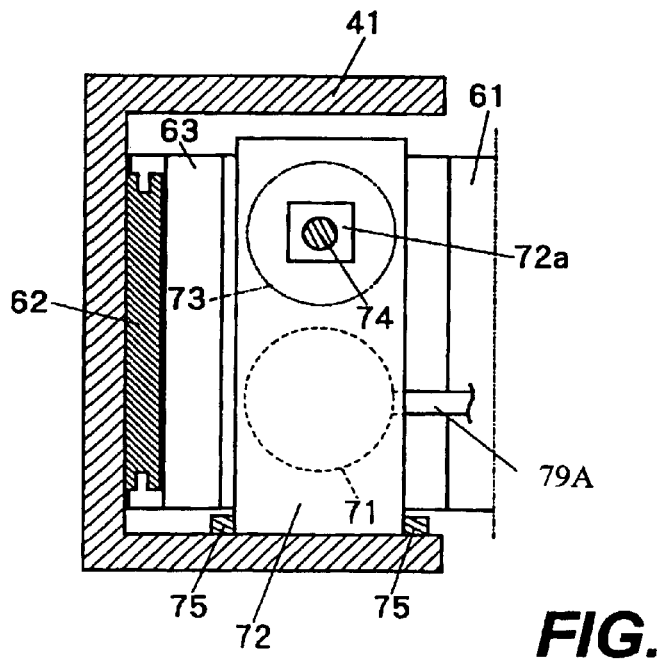
FIG. 6 is a sectional view taken along line 6—6 of FIG. 2.

The moving mechanism 70 is contained inside the rotary frame 41, as shown in FIG. 2, and comprises another air cylinder 71 (herein referred to as the "second air cylinder") with a piston rod 71a having its tip fastened to the slider member 63, an attachment plate 72 for fastening this air cylinder 71, a motor 73 attached to an inner surface of the rotary frame 41 and a screw bar 74 attached to the drive shaft (not shown) of this motor 73. As shown in FIG. 5, the interior of the second air cylinder 71 is partitioned by means of a piston member 71b into a first air supply chamber 71c and a second air supply chamber 71d, and there are also provided air passages 79a and 79b (shown in FIG. 8) for supplying air from an external compressed air source (shown at 100 in FIG. 8) therethrough. The second air cylinder 71 is adapted to function such that the piston rod 71a will stick out to move the heater unit 50 and its support unit 60 to the aforementioned retracted position if air is supplied into the first chamber 71c through the air passage 79a to raise its internal pressure and that the piston rod 71a will move back to move the heater unit 50 and its support unit 60 to the sealing position if air is supplied into the second chamber 71d through the air passage 79b to raise its internal pressure.

Figure 7:
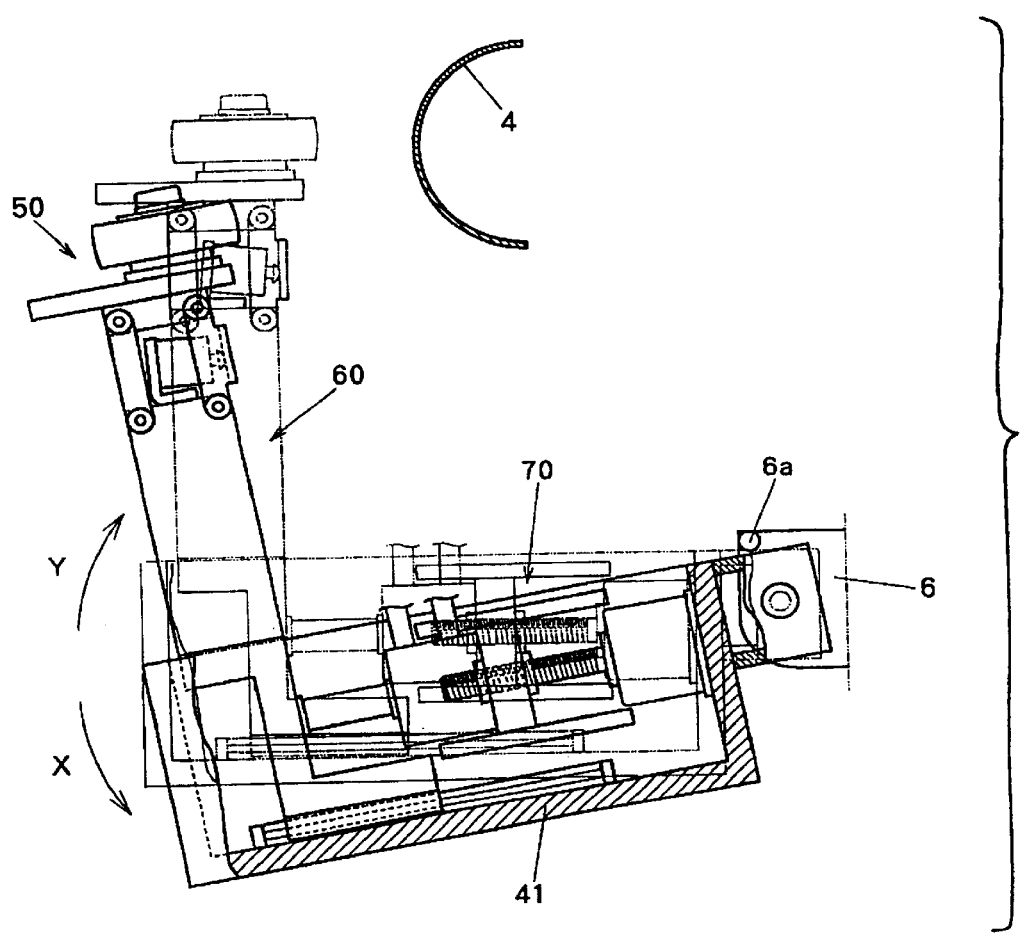
FIG. 7 is a plan view of the rotary frame of the packaging machine of FIG. 1, showing its rotary motion.

The attachment plate 72 for the second air cylinder 71 engages with the screw bar 74, and guide members 75 are provided on the lower surface of the rotary frame 41 such that the attachment plate 72 will be prevented from undergoing any rotary motion when the motor 73 is activated but will move longitudinally along the screw bar 74 while remaining in the upright position. As explained above, the heater unit 50 is moved between the sealing position and the retracted position during a normal course operation. Thus, the distance between the sealing position and the retracted position is relatively short. An area in which these positions are found will be herein referred to as the "work area". When the chute 4 is replaced by another with a different size or when the initial position of the heater unit 50 or its support unit 60 is automatically set according to the size or the set position of the chute 4, for example, the heater unit 50 is removed much farther away from the working area so as to provide a sufficiently large space, say, for exchanging the chute 4. Such an farther removed area will be herein referred to as the "non-work area". The motor 73 may thus be described as serving to move the heater unit 50 between the work and non-work areas. The attachment plate 72 has a protruded portion 72a at its center where it is penetrated by the screw bar 74 so as to make it easier for the attachment plate 72 to move along the screw bar 74. In FIGS. 4 and 7, numeral 6a indicates a stopper for not allowing the rotary frame 41 to rotate further in the clockwise direction (as indicated by arrow Y in FIG. 7) from the set position indicated by dotted lines, although it is allowed to move in the counter-clockwise direction (as indicated by arrow X in FIG. 7), say, to reach the position shown by solid line in FIG. 7.

Figure 8:
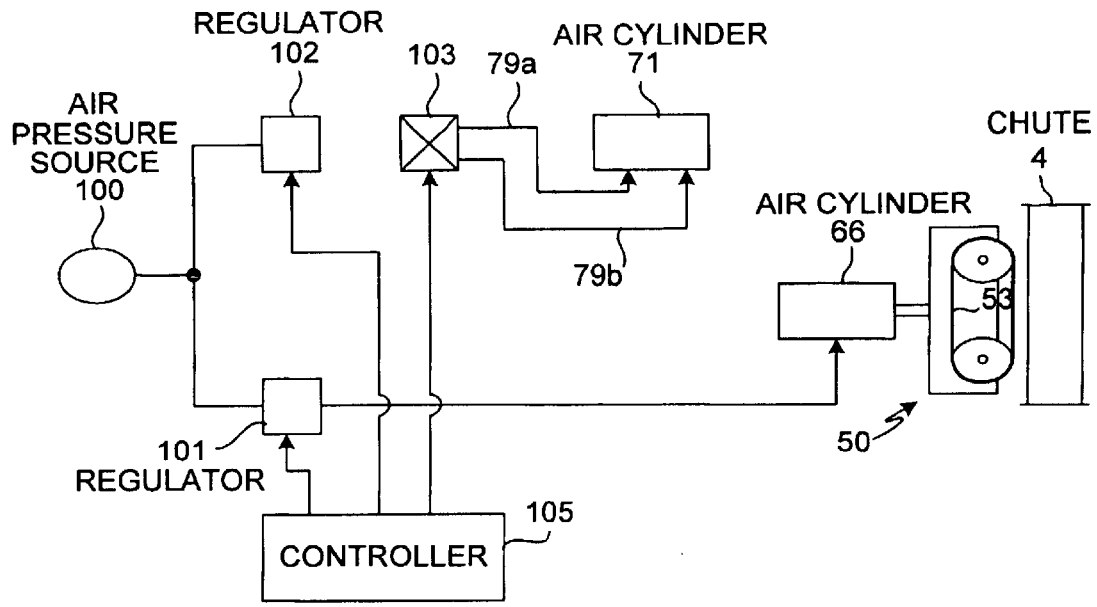
FIG. 8 is a block diagram of the control system of the packaging machine of FIG. 1 for the longitudinal sealing.

Next, the air supply system for supplying air to the first and second air cylinders 66 and 71 will be explained. As shown in FIG. 8, these air cylinders 66 and 71 are each provided with a regulator 101 or 102 (herein referred to as the "first regulator" 101 and the "second regulator" 102 for the convenience of description) for providing specified air pressures. As briefly mentioned above, the packaging machine 1 is provided with an air pressure source 100 for generating an air pressure for supplying air into the bags to be made. Each of these regulators 101 and 102 is connected to the air pressure source 100 and is adapted to adjust the air pressure of the source 100 to a specified level. The air supply system further includes a switch valve 103 for selectively connecting the second regulator 102 to either of the air passages 79a and 79b. If the switch valve 103 opens the first air passage 79a, a specified higher air pressure prepared by the second regulator 102 is applied to the first supply chamber 71c and the piston rod 71a protrudes from the second air cylinder 71 such that the support unit 60 moves the heater unit 50 to the retracted position. If the switch valve 103 opens the second air passage 79b, the piston rod 71a is retracted into the second air cylinder 71 such that the support unit 60 moves the heater unit 50 to the sealing position.

The first regulator 101 is for supplying air having a specified lower pressure to the first air cylinder 66. When the first regulator 101 is activated, the piston rod 66a of the first air cylinder 66 protrudes, causing the heater unit 50 to move towards the chute 4. The operations of the switch valve 103 and the regulators 101 and 102 are controlled by a controller 105.

When the packaging machine 1 is started, the controller 105 activates the motor 73 to move the heater unit 50 and its support unit 60 to the preliminarily determined sealing position as shown in FIG. 9 and also the first regulator 101 so as to adjust the air pressure and to thereby press the heater belt 53 against the chute 4 at the sealing position by maintaining a constant compressive force. If a trouble occurs during the sealing process by the heater belt 53 such as the breaking of the film, the second air cylinder 71 is activated to move the heater unit 50 and its support unit 60 to the retracted position. At the time of exchanging the chute 4 and the former 3, the motor 73 is operated to move the heater unit 50 not only to the retracted position but also to the non-work area farther away from the chute 4 because a sufficient space cannot be secured for exchanging the chute 4 if the heater unit 50 and its support unit 60 are moved only to the aforementioned retracted position which is still within the work area.

In summary, the packaging machine 1 thus structured is characterized as using two air cylinders 66 and 71 and two regulators 101 and 102 for the sealing operation by the heater belt 53. Unlike the prior art packaging, machine which used a spring to adjust the compressive force by which the heater belt carries out the sealing, therefore, there is no need for a manual adjustment of the compressive force of the spring when the chute has been deformed after many years of use. Instead, a desired compressive force can be applied even after the chute has been deformed or the position of its attachment has been changed such that the sealing position has undergone a change. Adjustments can be easily effected according to this invention merely by moving the heater belt between a contacting position and a retracted position and the heater belt can also be moved between the work and non-work areas by means of only a single air supply system. Since the means for driving the heater unit 50 and its support unit 60 and the means for adjusting the compressive force of the heater unit 50 are both comprised of an air cylinder, furthermore, one single air pressure source can control both of these means, and this serves to simplify the structure of the packaging machine. The controller 105 may be further adapted to preliminarily register a plurality of air pressure values such that automatic control or remote control operations can be effected thereby.

Figure 10:
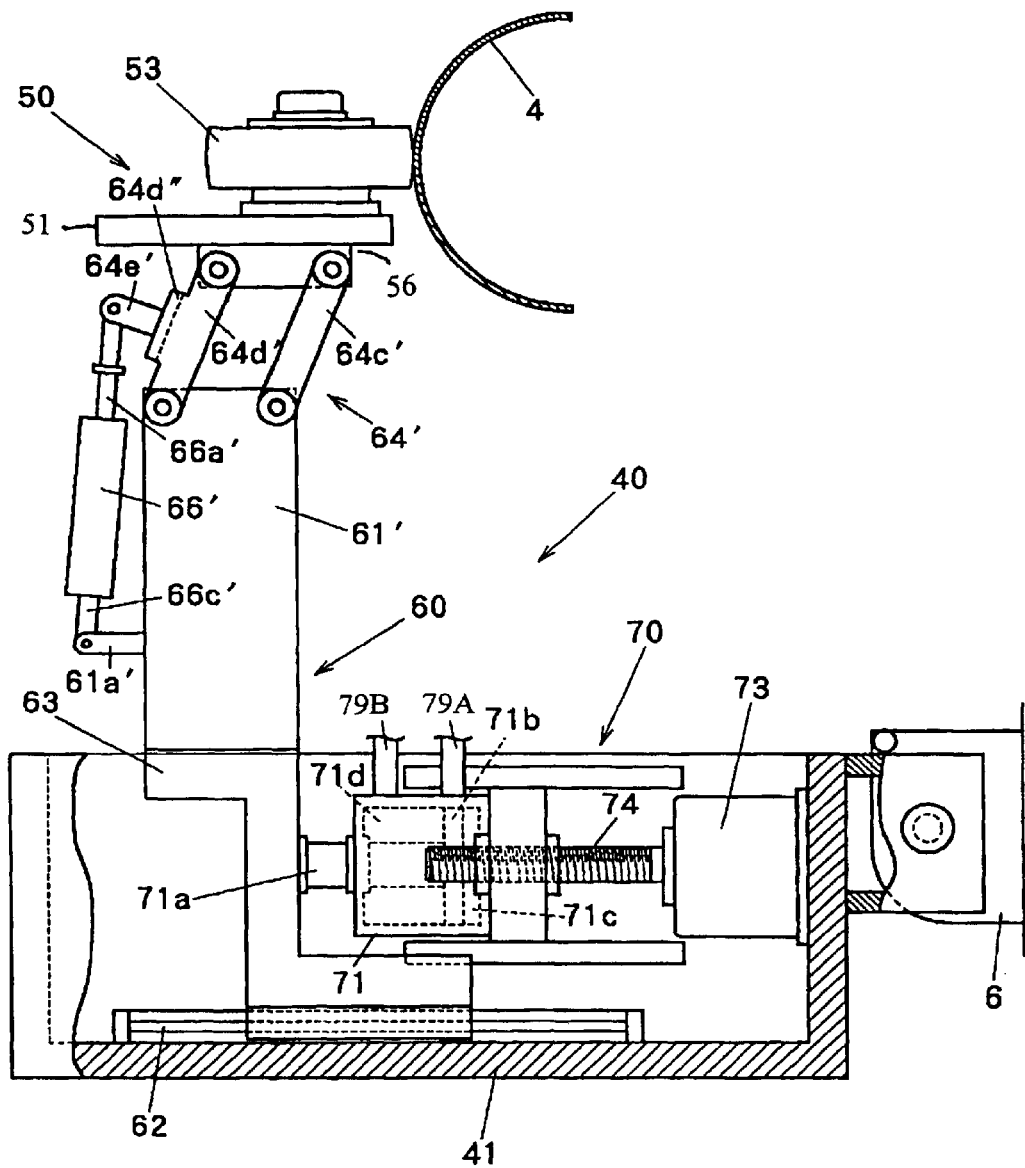
FIG. 10 is a plan view of a center portion of another packaging machine embodying this invention.

FIG. 10 shows another packaging machine which may be regarded as a variation of the packaging machine described above with reference to FIG. 19. It is different only regarding the shape and the positioning of its first air cylinder for adjusting the pressure with which the heater unit is to compress the film for longitudinal sealing. Hence, the other like or equivalent components are indicated in FIG. 10 by the same numerals as in FIGS. 1–9 for convenience and are not explained repetitiously.

FIG. 10 also shows that the support plate 56, attached to the attachment plate 51 of the heater unit 50, is connected with the arm member 61' by means of a pair of mutually parallel link mechanisms 64' (of which only link members 64c' and 64d' are seen), but its pressure-controlling air cylinder 66' is not disposed inside the link mechanisms 64' but its back end is supported rotatably by a support member 61a' attached to the arm member 61' and the tip of its rod 66a' is rotatably connected to a support part 64e' provided on the outer surface of an extended portion 64d" of the link member 64d' away from the chute 4. If the rod 66a' is pushed out of the air cylinder 66', the heater unit 50 is shifted towards the chute 4. If the rod 66a' is retracted into the air cylinder 66', the heater unit 50 is moved away from the chute 4. In this manner, the pressure to be exerted on the film by the heater unit 50 for effecting longitudinal sealing can be controlled.

Figure 12:
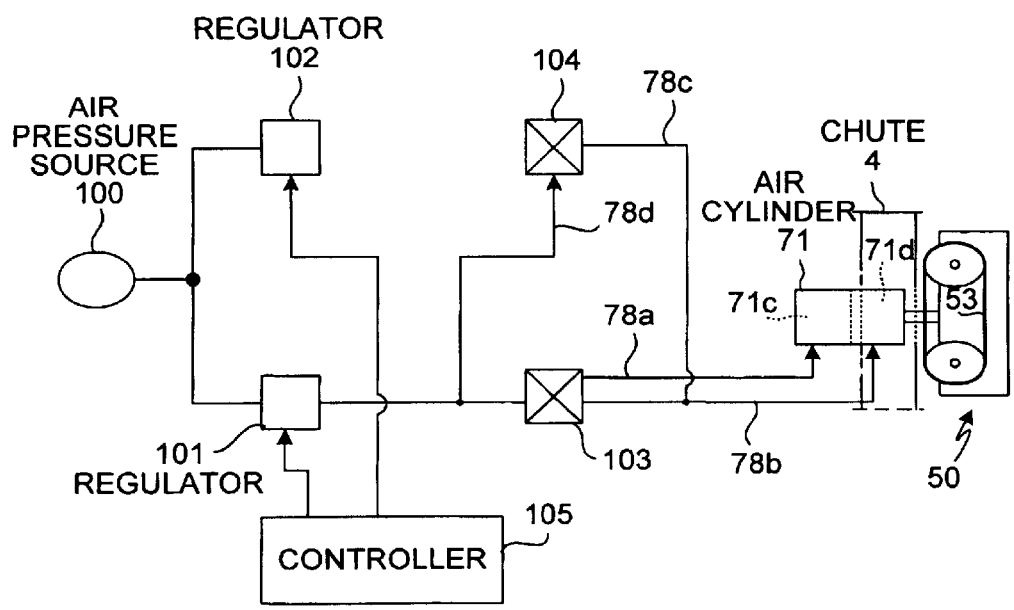
FIG. 12 is a block diagram of the control system of the packaging machine of FIG. 11 for the longitudinal sealing.
Figure 11:
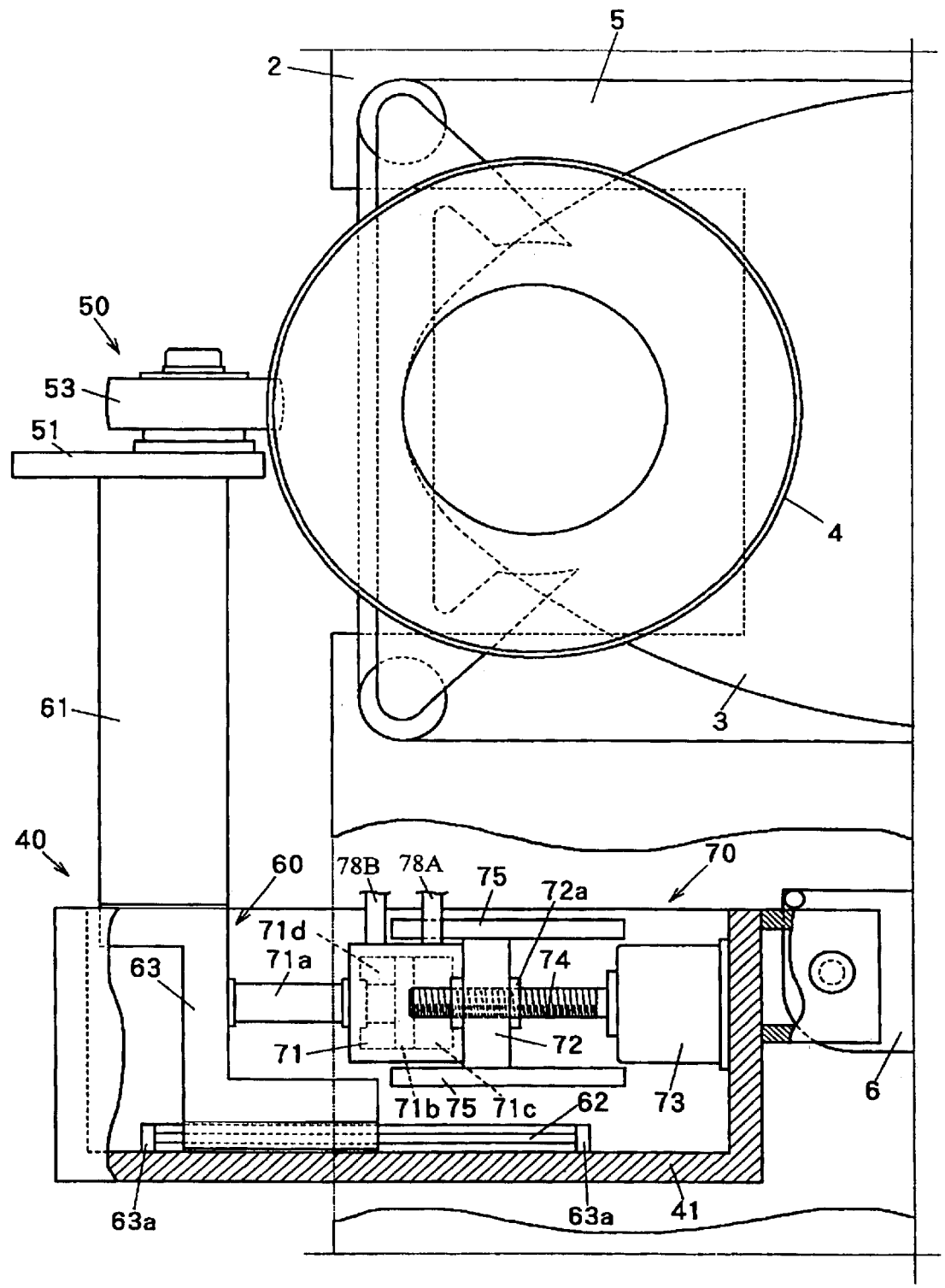
FIG. 11 is a plan view of a center portion of still another packaging machine embodying this invention.

Next, FIGS. 11 and 12 are referenced to explain another packaging machine according to a different embodiment of the invention. Since this embodiment is different only in the manner in which its heater unit 50 is supported by the arm member 61, FIG. 11 employs the same numerals to indicate like or equivalent components.

As shown in FIG. 11, the heater unit 50 according to this invention is not connected to the arm member 61 by means of a movable linking mechanism 64 but is affixed to the arm member 61 and the pressure exerted by the heater unit 50 onto the film for longitudinal sealing is controlled by the same air cylinder 71 which also serves to move the heater unit 50 between the aforementioned sealing position and retracted position.

The air supply system for supplying air to the air cylinder 71 of the packaging machine of FIG. 11 is explained next with reference to FIG. 12 wherein like components as described above with reference to FIG. 8 are again indicated by the same numerals.

As explained above and again shown in FIG. 12, the air cylinder 71 has two air supply chambers (the "first air supply chamber 71c" and the "second air supply chamber" 71d) and is connected to two regulators (herein the "first regulator 101" and the "second regulator 102"), both adapted to receive air from a common air supply source 100 which also serves to supply air to be introduced into the bags which are formed by the packaging machine. The first regulator 101 is for supplying air at a higher pressure for moving the heater unit 50 and the second regular 102 is for supplying air at a lower pressure for controlling the pressure to be exerted by the heater unit 50 for effecting longitudinal sealing. Air passages 78a, 78b, 78c and 78d, as well as two switch valves (the "first switch valve 103" and the "second switch valve 104") are also connected as shown. Air passages 78a and 78b are respectively for supplying the higher-pressure air prepared by the first regulator 101 through the first switch valve 103 to the first or second air supply chamber 71c or 71d of the air cylinder 71. Air passage 78c is for supplying the lower-pressure air prepared by the second regulator 102 to the second air supply chamber 71d of the air cylinder 71 through the second switch valve 104. If the first switching valve 103 opens the air passage 78a and closes the air passage 78b and the second switching valve 104 closes the air passage 78c, air with the higher pressure is supplied into the first air supply chamber 71c such that the heater unit 50 is moved to the retracted position. If the first switching valve 103 closes the air passage 78a and opens the air passage 78b while the air passage 78c is closed by the second switching valve 104, air with the higher pressure is supplied into the second air supply chamber 71d such that the heater unit 50 is moved from the retracted position to the sealing position. If the air passages 78a and 78b are both closed by the first switching valve 103 while the air passage 78c is opened by the second switching valve 104, air with the lower pressure is supplied into the second air supply chamber 71d such that the compressive force of the heater belt 53 at the sealing position is controlled. These switching valves 103 and 104 and the regulators 101 and 102, as well as the motor 73 are all controlled by a controller 105.

Prior to the regular operation of the packaging machine 1, the heater unit 50 and its support unit 60 are both in the non-work area while the piston rod 71a of the air cylinder 71 is fully pushed out. As the operation of the packaging machine 1 is started, the controller 105 not only controls the motor 73 to move the heater unit 50 and its support unit 60 into the work area but also activates the first regulator 101 and the first switch valve 103 such that the heater unit 50 and its support unit 60 will reach the sealing position. Additionally, the second regulator 102 and the second switching valve 104 are activated to control the air pressure such that the heater belt 53 will contact the mutually overlapping edge parts of the film and the compressive force thereby on the film will be maintained at a specified level.

Should an abnormal condition be detected during this sealing operation such as the breaking of the film, the air cylinder 71 is operated such that heater unit 50 and its support unit 60 are moved to the retracted position. When a time comes to exchange the chute 4 and the former 3, the heater unit 50 and its support unit 60 are moved not only to the retracted position within the work area but farther away into the non-work area by means of the motor 73 such that a sufficiently large space for the exchange can be secured.

As shown in FIG. 12, there is still another air passage 78d provided through which air with the higher pressure prepared by the first regulator 101 can be supplied into the air passage 78c through the second switch valve 104. When the air passages 78a and 78b are both closed by the first switch valve and the air passage 78c is opened by the second switch valve such that air of the lower pressure is supplied into the second air supply chamber 71d, the controller 105 is adapted to operate the second switching valve 104 such that the air passages 78c and 78d are connected through for a specified length of time and hence that air of the higher pressure is supplied into the air passage 78c. This is for the purpose of preventing a delay in the motion of the piston member 71b due to the static friction between the piston member 71b and the wall surface of the air cylinder 71 while air of the lower pressure is being supplied and to thereby prevent the speed of motion of the heater unit 50 and its support unit 60 from becoming slowed down. It now goes without saying that the controller 105 of FIG. 12, too, may also be further adapted to preliminarily register a plurality of air pressure values such that automatic control or remote control operations can be effected thereby.

What is claimed is:

1. A method of longitudinally sealing overlapping portions of a tubularly formed bag-making material by means of a heater unit at a sealing position, said method comprising the steps of:

moving said heater unit from a retracted position to said sealing position by supplying air at a higher pressure to an air cylinder which serves to move said heater unit reciprocatingly between said retracted position and said sealing position; and thereafter supplying air at a lower pressure which is lower than said higher pressure to said air cylinder and controlling said lower pressure to cause said heater unit to longitudinally seal said bag-making material at a specified sealing pressure.

2. The method of claim 1 wherein air at said lower and higher pressures is supplied from a single air source and by varying the pressure of air at said air source to said lower and higher pressures and by using a switch means for selectively providing air at said lower pressure or said higher pressure.

3. The method of claim 1 wherein said specified sealing pressure is selected according to thickness of said bag-making material.

4. The method of claim 1 wherein said specified sealing pressure is selected according to a material characteristic of said bag-making material.

5. The method of claim 1 wherein said air cylinder has a first chamber and a second chamber, said first chamber serving to supply air for moving said heater unit to said retracted position, said second chamber serving to supply air for moving said heater unit to said sealing position.

6. The method of claim 5 comprising the step of supplying air of said lower pressure into said second chamber of said air cylinder to control air pressure for sealing said bag-making material longitudinally at said specified sealing pressure.

7. The method of claim 1 wherein air of said higher pressure is supplied to said air cylinder for a specified length of time while air of said lower pressure is supplied to said air cylinder.

* * * * *